United States Patent
Shim et al.

(10) Patent No.: US 11,684,880 B2
(45) Date of Patent: *Jun. 27, 2023

(54) SELF SUPPORTING PLEATABLE WEB AND AN OIL FILTER INCLUDING THE SAME

(71) Applicant: Ahlstrom Oyj, Helsinki (FI)

(72) Inventors: Jesse Shim, Daegu (KR); Kevin Kim, Daegu (KR); Ryan Kwon, Daegu (KR); Jinny Kim, Daegu (KR); Jamie Byeon, Daegu (KR); David Alan Topolenski, Madisonville, KY (US); Kevin Ray Townsend, Providence, KY (US)

(73) Assignee: Ahlstrom Oyj, Helsinki (FI)

( * ) Notice: Subject to any disclaimer, the term of this patent is extended or adjusted under 35 U.S.C. 154(b) by 118 days.

This patent is subject to a terminal disclaimer.

(21) Appl. No.: 16/945,663

(22) Filed: Jul. 31, 2020

(65) Prior Publication Data

US 2021/0283540 A1  Sep. 16, 2021

Related U.S. Application Data

(63) Continuation of application No. 15/523,480, filed as application No. PCT/EP2015/075318 on Oct. 30, 2015, now Pat. No. 10,765,979.

(Continued)

(30) Foreign Application Priority Data

Nov. 28, 2014 (FI) .................................... 20146043

(51) Int. Cl.
*B01D 39/16* (2006.01)
*B01D 39/18* (2006.01)
*B01D 39/20* (2006.01)

(52) U.S. Cl.
CPC .......... *B01D 39/163* (2013.01); *B01D 39/18* (2013.01); *B01D 39/2024* (2013.01);
(Continued)

(58) Field of Classification Search
CPC .. B01D 39/163; B01D 39/18; B01D 39/2024; B01D 2239/10; B01D 2239/025;
(Continued)

(56) References Cited

U.S. PATENT DOCUMENTS 10,765,979 B2 * 9/2020 Shim .................... B01D 39/163
2001/0036890 A1 11/2001 Braswell et al.
2007/0271889 A1 11/2007 Jaffee

FOREIGN PATENT DOCUMENTS

CH  551565 A  7/1974
CN  107106952 B  7/2020
(Continued)

OTHER PUBLICATIONS

First Office Action—Chinese Patent Application No. 202010596052.5, dated Aug. 11, 2021, CNIPA.

*Primary Examiner* — John Kim
(74) *Attorney, Agent, or Firm* — Edwin A. Sisson, Attorney at Law, LLC; Jeffrey J. Banyas

(57) ABSTRACT

A fibrous media suitable for an oil filter comprising a fibrous web formed from synthetic fibers; optionally at least one additive, and a thermoset binder present at a concentration of at least 15 wt.-% by weight of the fibrous web and/or at least one binder fiber, wherein the synthetic fibers comprise up to 30 wt.-%, preferably up to 20 wt.-%, glass fibers, based on the total weight of the fibers. The fibers are bonded with the thermoset binder and/or the at least one binder fiber to form a web; and the fibrous media is capable of forming a self-supporting, pleated oil filter media which is capable of (Continued)

retaining pleats upon contact with oil having a temperature in the range encountered in a combustion engine.

19 Claims, 3 Drawing Sheets

Related U.S. Application Data

(60) Provisional application No. 62/073,066, filed on Oct. 31, 2014.

(52) U.S. Cl.
CPC .... *B01D 2239/025* (2013.01); *B01D 2239/04* (2013.01); *B01D 2239/086* (2013.01); *B01D 2239/10* (2013.01); *B01D 2239/1216* (2013.01); *B01D 2239/1233* (2013.01); *B01D 2239/1291* (2013.01)

(58) Field of Classification Search
CPC .... B01D 2239/1291; B01D 2239/1233; B01D 2239/1216; B01D 2239/086; B01D 2239/04
See application file for complete search history.

(56) References Cited

FOREIGN PATENT DOCUMENTS

| | | |
|---|---|---|
| KR | 10-0819355 B1 | 4/2008 |
| KR | 10-2014-0000244 A | 1/2014 |
| WO | WO 2012/054672 A1 * | 4/2012 |

* cited by examiner

SELF SUPPORTING PLEATABLE WEB AND AN OIL FILTER INCLUDING THE SAME

This application is a continuation of U.S. application Ser. No. 15/523,480 filed on May 1, 2017 now U.S. Pat. No. 10,765,979, which is the U.S. national phase of International Application No. PCT/EP2015/075318 filed Oct. 30, 2015 which designated the U.S. and claims priority to U.S. Provisional Application No. 62/073,066 filed Oct. 31, 2014 and FI Patent Application No. 20146043 filed Nov. 28, 2014, the entire contents of each of which are hereby incorporated by reference.

TECHNICAL FIELD

The present invention relates to filter media for oil filters. In particular, the present invention relates to filter media formed from synthetic fibers, optionally at least one additive and at least one thermoset binder and/or at least one binder fiber, wherein the synthetic fibers comprise up to 30 wt.-%, preferably up to 20 wt.-%, glass fibers, based on the total weight of the fibers, wherein the fibers are bonded with the thermoset binder and/or the at least one binder fiber to form a fibrous medium. The invention also relates to a method of producing such filter media as well as to self-supporting pleated oil filters produced from the media.

BACKGROUND

Oil filters intended for use in combustion engines conventionally comprise filter media with fibers obtained from wood pulp. Such wood pulp fibers are typically 1 to 7 millimeters long and 15 to 45 microns in diameter. Natural wood pulp has largely been the preferred raw material for producing filtration media due to its relatively low cost, processability, various mechanical and chemical properties, and durability in the end application.

The filter media are pleated to increase filtration surface area transversally to the direction of the oil flow.

U.S. Pat. No. 3,288,299 discloses a dual type of oil filter cartridge wherein part of the flow is through a surface type of filter element, such as pleated paper, and the rest of the flow is through a depth type of filter element such as a thick fibrous mass. An oil filter and adapter is disclosed in U.S. Pat. No. 3,912,631.

A typical prior art oil filter is shown in FIG. 1. Reference numeral 1 refers to the pleated filter media (or filtration media) and 2 to a backing structure. A conventional filter media exhibits low stiffness and has poor mechanical strength in terms of tensile strength and burst strength. The filter media 1 is therefore used together with a metal mesh or other type of support means 2, which forms a backing for the filter media and assists in maintaining the pleat shape when used in the end application.

Nevertheless, in view of the low mechanical strength the filter media tend to burst over time on exposure to engine oil at the temperatures encountered in a combustion engine, such as 125-135° C.

Although filter media products that are produced largely with wood pulp are still an excellent choice for most automotive and heavy duty oil filtration applications, there is a growing market demand for oil filtration products that exhibit increased strength and durability over time as the media is exposed to the various chemical, thermal, and mechanical stresses of the end application environment. This demand stems from both harsher end application conditions that the media is exposed to as well as increasing demand for filter media that can be safely used in the end application for increasingly longer amounts of time without rupturing or failing.

The long-standing and widely applied solution to this demand has been to incorporate some minor quantity of synthetic fiber, typically PET polyester, in the amount of about 5-20%. The result of fortifying the fiber furnish in this way is higher media strength as well as enhanced chemical and mechanical durability when the media is exposed to the end application environment, due to the superior chemical, thermal, and mechanical durability of the synthetic fibers themselves.

For air filters there are alternative technical solutions primarily based on non-natural fibers described in the art.

U.S. Pat. No. 7,608,125 discloses a MERV filter composed of a wet laid fibrous mat comprising about 20-60 wt-% of glass fibers, about 15-60 wt-% of polymer fibers, and about 15-40 wt-% of a binder for bonding of the fibers. The binder of this disclosure is latex modified with melamine formaldehyde.

Published US Patent Application No. 2012/0175298 discloses a HEPA filter comprising a nonwoven web of two different fiber components. The first fiber component is formed by fibers of polyesters, polyamides, polyolefin, polylactide, cellulose esters, polycaprolactone, polyactides, polyurethane, polyvinylchloride, and combinations thereof. The first fibers make up at least 20% of the weight of web. The second fiber can be composed of either cellulosic fibres (Lyocell) or glass or combination of the two. There is further a binder component formed by acrylic polymers, styrenic polymers, vinyl polymers polyurethanes, and combinations thereof.

Published US Patent Application No. 2013/0233789 discloses a glass-free non-woven fuel filtration media that is comprised of a blend of a staple synthetic fibers and fibrillated cellulosic fibers.

U.S. Pat. Nos. 7,488,365, 8,236,082 and 8,778,047 disclose further filtration media containing 50 to 100% of synthetic fibers of the weight of the fibrous web.

None of the references to air filters and fuel filter media discloses a filter medium capable of forming a self-supporting oil filter when configured into a pleated structure and which would be capable of working properly at the harsh conditions in connection with a combustion engine.

In fact, the known filtration media containing a high percentage of synthetic fibers are not pleateable or self-supporting as such, and they have to be co-pleated and reinforced with some sort of additional mechanical support layer, such as a plastic or wire mesh backing. Media made with high levels of synthetic fiber typically tend to exhibit drape and they lack sufficient stiffness and rigidity causing the pleats to collapse without an additional support. A 100% synthetic media as disclosed in the art cannot maintain a grooving pattern like corrugation or a pleated structure due to the thermal and mechanical properties of the synthetic fibers.

SUMMARY

The following presents a simplified summary in order to provide a basic understanding of some aspects of various embodiments of the invention.

The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

It is an aim of the present invention to eliminate at least some of the problems related to the art and to provide a novel kind of filter media which is capable of use as an oil filter in combustion engines.

According to one aspect the present disclosure concerns a self-supporting pleatable fibrous web for an oil filter, which web comprises synthetic fibers, optionally at least one additive, at least one binder fiber and/or a thermoset binder present at a sufficiently high concentration, such as e.g. at least 15% by weight of the fibrous web, to allow for bonding of the fibers to form a web and for rendering the fibrous media capable of forming a self-supporting, pleated oil filter, wherein the synthetic fibers comprise up to 30 wt.-%, preferably up to 20 wt.-%, glass fibers, based on the total weight of the fibers. The media thus obtained is capable of retaining pleats upon contact with oil having a temperature in the range typically encountered in a combustion engine, such as 125-135° C. (257-275° F.).

A filtration media (or filter media) of the present kind can, in an aspect of the present disclosure, be produced by forming a wet laid web from a fibrous slurry comprised of synthetic fibers and optionally at least one binder fiber and/or at least one additive; drying the web to a low moisture content; contacting the dried web with a composition of a thermoset binding agent in a liquid phase to bond the fibers together with the thermoset binder; removing the liquid phase to form a media, optionally corrugating and/or pre-curing the obtained media and pleating the obtained media, followed by an optional final curing step.

Another aspect relates to oil filters for combustion engines which incorporate filter media of the indicated kind.

A still further aspect of the present disclosure relates to the use of thermoset resins for preventing damage of an oil filter caused by a combination of oil and antifreeze agents and decomposition products thereof.

More specifically, the present filter media is characterized by what is stated in the characterizing part of the claims.

The present oil filter is characterized by what is stated in the characterizing part of the claims, and the present use is characterized by what is stated in the claims.

Considerable advantages are obtained by the present invention: The present fibrous media will give rise to self-supporting (i.e. stand-alone or unsupported) filters when pleated, optionally corrugated and shaped into the proper form of an oil filter, and do not require the use of a mesh backing in the finished filter device. Therefore they can be manufactured and supplied without the need of pairing with a mesh or other type of secondary material backing.

The present fibrous media are suitable as oil filters and exhibit good burst strength over time on exposure to hot engine oil.

The present fibrous media have lower degradation rates when exposed to hot engine oil than conventional filtration media that contain natural wood pulps.

As will be discussed below in more detail, synthetic materials for example comprising prior art fiber mixtures of the kind discussed above, would be vulnerable to glycol assisted disintegration which prevails at the conditions in, for example heavy duty diesel engines. Upon decomposition, such materials may disintegrate into the oil and even give rise to engine seizure and contamination of moving parts. By contrast, the present fibrous media have improved resistance to such disintegration and this provides extended operation times for the filters.

The fibrous media according to the present invention is readily groovable, i.e. corrugatable, and pleatable. And the material is capable of maintaining most of its original groove depth (or corrugation depth) even after long exposure times in hot engine oil having e.g. a temperature of 140° C. This feature also contributes to extended operation life of the present fibrous media.

The fibrous web produced as such also has sufficient strength such that it can be readily produced on typical style production equipment without undue inefficiencies such as those that may arise from web breaks, linting, wrinkling, etc.

In summary, the present invention eliminates the use of expensive backing materials, the obtained fibrous media are easily groovable (or corrugatable) and are easily pleatable. The end result is the ability to produce a filter with the present fibrous media without a support backing material while also achieving significantly higher burst strength than possible with traditional style oil filtration media that contain wood pulps, excellent resistance to glycol assisted disintegration and excellent dust filtration capacity and particle removal efficiency.

EMBODIMENTS

Figure 1:
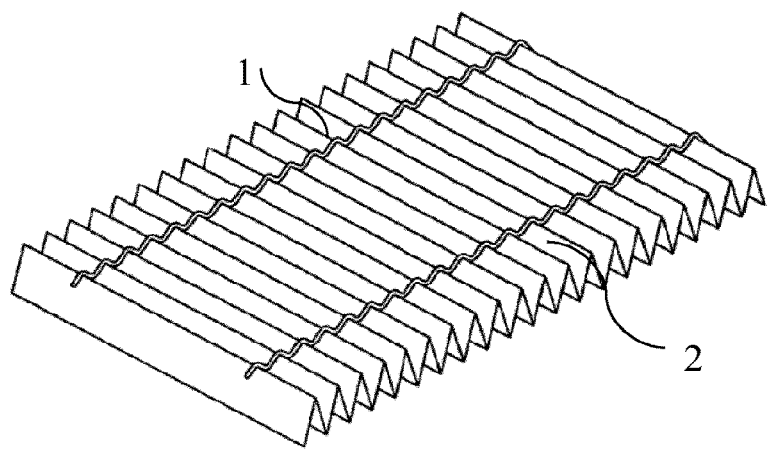
FIG. 1 shows an oil filter system according to prior art which includes two supporting structures for maintaining the pleats during use in e.g. a combustion engine.

A number of exemplifying and non-limiting embodiments of the invention are described in the accompanied dependent claims.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The term "consisting essentially of" has the meaning that specific further components may be present, namely those not materially affecting the essential characteristics of the fibers/composition in question.

As discussed above, in a preferred embodiment, the present fibrous media suitable for an oil filter comprises a fibrous web formed from synthetic fibers, optionally at least one additive, at least one binder fiber and/or a thermoset binder which is preferably present at a concentration of at least 15 wt-% by weight of the fibrous web, wherein the synthetic fibers comprise up to 30 wt.-%, preferably up to 20 wt.-%, glass fibers, based on the total weight of the fibers. The fibers are bonded with the thermoset binder and/or the binder fiber to form a fibrous media. The fibrous media thus obtained is capable of forming a self-supporting, pleated oil filter which is capable of retaining pleats and corrugations upon contact with oil having a temperature in the range encountered in a combustion engine such as e.g. 125 to 135° C.

Generally, the concentration of the thermoset binder is preferably in the range of 15 to 50 wt-% by weight of the fibrous web, in particular 15 to 30% by weight of the fibrous web. At a concentration of 15 wt-% or greater, excellent properties in terms of pleatability and self-supportability are achieved. At concentrations up to about 30%, efficiency of the filter as a filtering media is still unimpaired, although greater concentrations can still be used.

"Synthetic" is herein used to differentiate the present fibers from natural fibers obtainable directly from natural raw-materials. Thus, for the purpose of the invention, "synthetic" fibers include fibers of polymeric materials produced by polymerization of monomeric entities as well as fibers obtained by drawing of melt material and fibers obtained by regenerating natural fibers e.g. after dissolution of them in a solvent.

The fibrous media typically comprises synthetic fibers selected from the group of thermoplastic polymers, silicious fibers, such as glass fibers, regenerated cellulosic fibers and mixtures thereof.

In one embodiment, synthetic fibers of only one kind are used in the fibrous web.

In another embodiment, it is particularly preferred to use at least two different synthetic fibers.

In a further embodiment, at least 30 wt.-%, preferably at least 50 wt.-% of the fibers are thermoplastic polymers, based on the total weight of fibers.

Thus, in one particular embodiment, the fibrous media comprises
- a first fiber component consisting of fibers selected from the group of synthetic thermoplastic fibers;
- a second fiber component consisting of fibers selected from a group of silicious fibers and optionally further comprising regenerated cellulosic fibers, and combinations thereof;
- optionally a third fiber component consisting of binder fibers;
- the fibers of the first and the second and optionally the third fiber components being mixed together, and
- a thermoset binder wherein the thermoset binder is being capable of bonding together the first, the second and optionally the third fiber components.

According to another aspect the present disclosure concerns an oil filter which essentially consists of a self-supporting fibrous web which comprises:
- a first fiber component consisting of fibers selected from the group of synthetic thermoplastic fibers;
- a second fiber component consisting of silicious fibers; the fibers of the first fiber component forming a majority of the fibers of the fibrous web; and
- a thermoset binder which forms at least 15%, by weight of the fibrous web.

In a still further embodiment, which can be combined with any of the fore-going embodiments, the first fiber is preferably a synthetic thermoplastic fiber, such as polyester, and forming 30 to 99.5%, in particular 40 to 99%, for example 43 to 98% by weight of the fibers of the fibrous web.

The second fiber is selected from a group of glass fibers, optionally mixed with Lyocell, regenerated cellulose and combinations thereof. The amount of the second fiber is preferably 0.1 to 70%, in particular 1 to 60%, for example 2 to 57% by weight of the fibers of the fibrous web.

Figure 3:
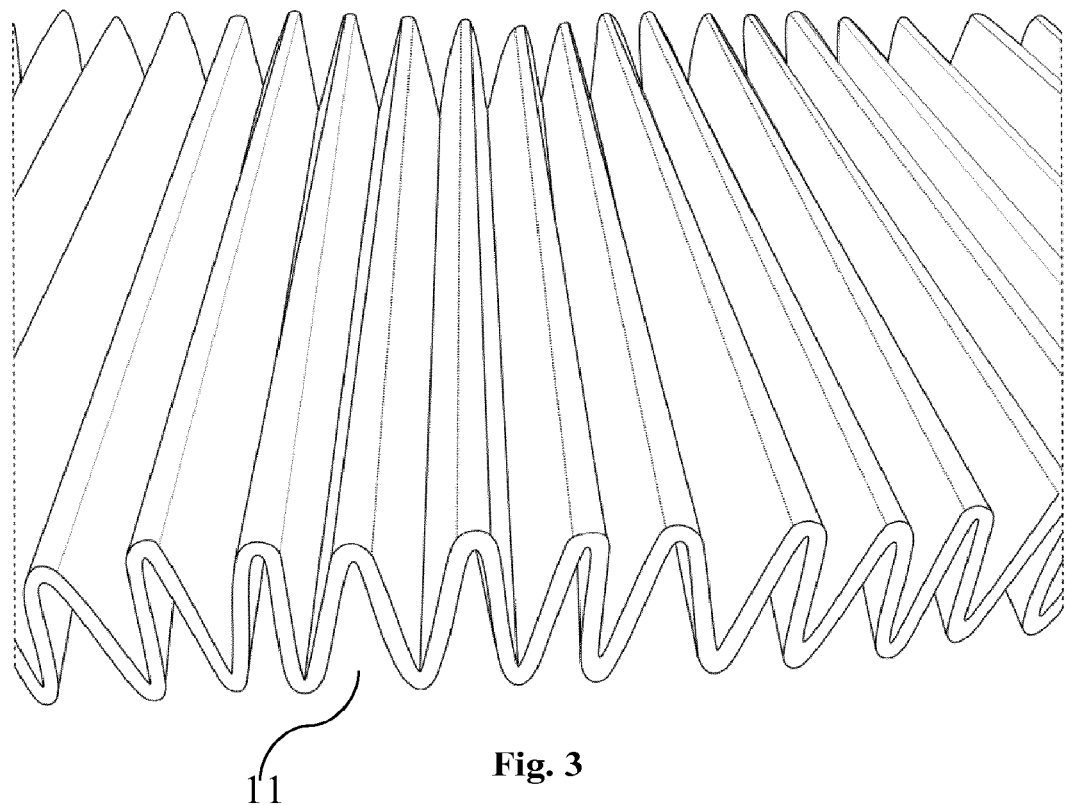
FIG. 3 shows an exemplary non-limiting pleated self-supporting medium according to the present invention.

As defined herein, the term "self-supporting pleatable web" or self-supporting pleated filter media" is a web or a filter media whose pleats have sufficient stiffness so that they do not collapse or bow excessively when subjected to oil pressure typically encountered in combustion engines. In one preferred embodiment, the media can be provided with pleats having a sharp angle of less than 30°, in particular less than 25° (see also FIG. 3). Typically, a "pleatable" media will be capable of taking up pleats and retaining them. Preferably, the pleated media will retain pleats over the whole operation time of the filter.

Figure 4:
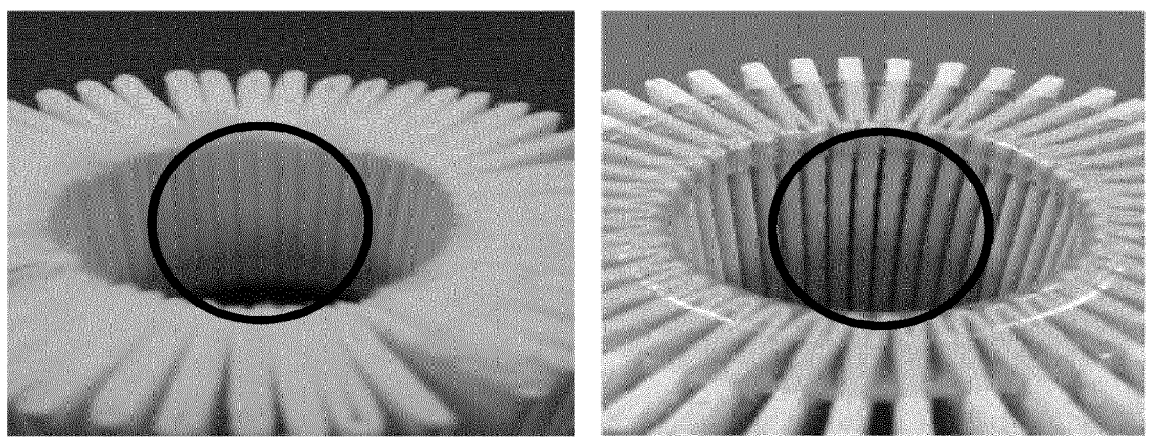
FIG. 4 shows a non-corrugated pleated filter medium (left) and a corrugated pleated filter medium (right), thereby illustrating the improved flow through the pleats when using a corrugated pleated filter medium.
Figure 5:
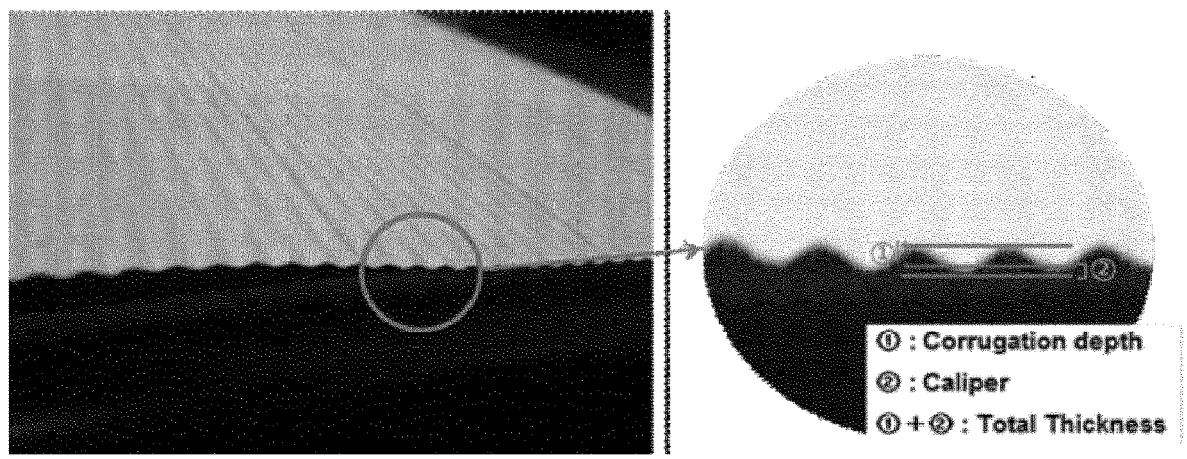
FIG. 5 shows the relation between caliper, total thickness and corrugation depth of a non-limiting exemplary fibrous medium of the present invention.

As defined herein, the term "corrugation" or "grooving" has the meaning commonly used in the art. Specifically, it can be preferably defined as relating to a surface structure of alternate ridges or grooves and is typically applied in a direction perpendicular to the pleat direction in order to further increase the effective surface area of the media without the necessity of increasing the outer dimensions of the media. Preferably, the corrugation depth (or grooving depth) is about 0.1-0.6 mm. The "corrugation depth" relates to the difference between the caliper (or thickness) of the flat sheet of medium and the thickness of the sheet after corrugating the medium (see also FIG. 5). Corrugation is particularly important in coiled filter arrangements of pleated filters in which the pleats extend parallel to the central axis of the coiled filter arrangement. As the number of pleats increases within a given volume, the pleats come to lie in close abutment against one another, in particular on the outflow side of the filter, thereby reducing the flowrate of the medium to be filtered and consequently increasing flow resistance of the filter arrangement (see also FIG. 4, right side showing a corrugated filter system according to the invention). Thus, corrugation allows for an undisturbed, more uniform flow of the medium to be filtered by increasing the rate of flow compared to a non-corrugated filter as e.g. shown in FIG. 4, left side.

As defined herein, the term "fibrous" means a material that is composed predominantly of fiber and/or staple fiber.

In the present context, the term "thermoplastic" means a plastic which becomes pliable or moldable above a specific temperature and returns to a solid state upon cooling. Exemplary thermoplastic fibers suitable for the present disclosure are polyesters (e.g., polyalkylene terephthalates such as polyethylene terephthalate (PET), polybutylene terephthalate (PBT) and the like), polyalkylenes (e.g., polyethylenes, polypropylenes and the like), poyacrylonitriles (PAN), and polyamides (nylons, for example, nylon-6, nylon 6,6, nylon-6,12, and the like).

Preferred are PET fibers which exhibit good chemical and thermal resistance which are properties of importance for the use of the media as oil filters.

In an embodiment, the thermoplastic synthetic fibers are selected from fibers having an average diameter from 0.1 um to 15 um, such as 0.1 um to 10 um, and an average length from 1 to 50 mm, such as 1 to 20 mm. In general, fibers having a length greater than 5 mm, in particular greater than 10 mm, are preferred for good burst strength.

In the present context, "silicious fibers" primarily stands for "glass" fibers such as microglass fibers. Such fibers generally have an aspect ratio (ratio of length to diameter) of 1,000 to 1.

In one embodiment, the glass fibers have an average diameter from 0.1 um to 5 um, and an aspect ratio of 1,000 to 1. In particular, the glass fibers may have an average fiber diameter of 0.4 to 2.6 um.

Glass fibers are preferably included in a sufficient amount to improve efficiency of the fibrous media as a filter. In one embodiment, the synthetic fibers comprise up to 30 wt.-%, preferably up to 20 wt.-%, based on the total weight of the fibers, of glass fibers. Although the synthetic fibers comprise only up to 30 wt.-% or up to 20 wt.-% of glass fibers, based on the total weight of the fibers, this amount is sufficient to prepare a fibrous media for a filter having excellent particle removal efficiency and hot oil burst strength as shown in the examples. Typically, synthetic filter media of the prior art include a high amount of glass fibers for achieving a sufficient filtration efficiency of a gas or a liquid, even under high temperature conditions such as e.g. 150° C. However, by using less glass fibers in the fibrous media as set forth in the claims, fibrous media may be provided that have excellent filtration properties in terms of particle removal efficiency and hot oil burst strength.

In particularly preferred embodiments, there are at least two kinds of glass fibers present, viz. a first group of fibers having an average fiber diameter of less than 1 um and a second group which having an average fiber diameter of 2 um or more. The weight ratio of the two groups of fibers is typically 1:100 to 100:1, in particular about 1:10 to 10:1.

The synthetic fibers may also include up to 40% by weight, preferably up to 30% by weight, based on the total weight of the fibers, of a regenerated cellulosic material, such as Lyocell or viscose or combinations thereof.

In a further embodiment, the present fibrous media suitable for an oil filter comprises a fibrous web formed from, or comprising,
- a first fibrous component consisting of synthetic thermoplastic fibers, the synthetic fibers having an average diameter from 0.1 um to 10 um and an average length from 1 to 20 mm; and
- a second fibrous component consisting of silicious fibers; the fibers of the first fibrous component forming a majority of the fibers of the fibrous web such as up to 70% by weight, based on the total weight of the fibrous components; and
- a thermoset binder present at a concentration of at least 15%, by weight of the fibrous web.

According to another embodiment the fibrous web according to the present disclosure comprises a combination of first and second fibrous components, wherein
the first fibrous component forms 70% to 88% of the fibrous web by weight;
the second fibrous components, of for example glass fibers, forms 12% to 30% of the fibrous web by weight.

In preferred embodiments, the synthetic fibers may also include undrawn synthetic fibers such as undrawn thermoplastic synthetic fibers. Undrawn fibers are common in the art. Although undrawn fibers typically do not have the mechanical properties such as tensile strength and modulus that are required for practical use, it was surprisingly found out that undrawn fibers may improve the web's capability for retaining not only pleats but also corrugation upon contact with oil having a temperature in the range encountered in a combustion engine such as 125 to 135° C. They may also contribute to improve the filter efficiency of the filter as defined herein.

Undrawn fibers may be comprised up to 50% by weight, preferably up to 45% by weight, such as from 20 to 50% by weight or from 20 to 40% by weight, based on the total weight of the fibers.

Preferred are undrawn PET fibers. The undrawn fibers may preferably have an average fiber length of about 1 to 10 mm, such as about 5 to 10 mm.

By using undrawn synthetic fibers and by e.g. calendering the resulting wet-laid fibrous web under heat (e.g. up to 220° C.) and pressure using both top and bottom hot smooth rolls, the void fraction of the obtained fibrous web may be preferably adjusted in the range of approximately 70-95%, such as 80-90% which may be particularly beneficial for corrugation. This is because if, on the one hand, the void fraction is too low, the corrugation is easily embossed, but the filter properties of the resulting corrugated fibrous web are not sufficient. If, on the other hand, the void fraction is too high, then the fibrous web cannot be corrugated in the most preferred corrugation depth such as 0.1-0.6 mm. Moreover, the calendering may add strength for the further processing steps such as the corrugation, impregnation with the thermoset binder and/or pleating.

Without being bound by this theory, it is believed that the undrawn fibers may basically act as additional binder fibers, since they contract after being heated under the manufacturing conditions as described below in example 1.

The present media further includes a binder, in particular a thermoset binder, which preferably has a concentration of 15% to 50% by weight of the fibrous web or a binder fiber as defined below. The thermoset binder is preferably selected from phenolic resin, acrylic resin and/or epoxy resin and melamine resin or acrylic resins, or mixtures thereof. The concentration of the thermoset binder is selected such that effectively most of the fibers of the fibrous mixture are coated with the thermoset binder.

In an embodiment, the fibrous media comprises a coating made of thermoset binder, selected from the group of phenolic resins, acrylic resins, epoxy resins, melamine formaldehyde resins and combinations thereof.

Preferably the thermoset binder has a concentration of from 15% to 30% of the fibrous web by weight.

To further improve internal bonding between the fibers of the media, for example between the first and second fibers, bicomponent thermoplastic fibers (as specific binder fibers) can be employed. Such fibers typically comprise a thermoplastic core fiber surrounded by a meltable surface layer of a thermoplastic polymer which as a lower melting point than the material forming the core. The low melting point thermoplastic polymer may act as a thermoplastic binding agent when softened or partially melted during processing of the fibrous web by heating, thereby adhering to the fibers of the web. The higher melting material forming the core may act as a structural material. The average fiber diameter of these bicomponent thermoplastic fibers may be preferably in the range of about 2 to 20 um such as 10 um and the average fiber length of these bicomponent thermoplastic fibers may be preferably in the range of about 2 to 12 mm, such as about 6 mm. The amount of such fibers is 0.1 to 20% by weight, preferably about 0.5 to 5% by weight, based on the total weight of fibers.

Moreover, to further improve internal bonding between the fibers of the web, for example between the first and second fibers, other binder fibers can be employed. Such binder fibers are preferably thermoplastic binder fibers such as PET binder fibers or polyvinyl alcohol (PVOH) binder fibers. These binder fibers have typically a lower melting point than the synthetic fibers, thereby acting as a binding agent when softened or partially surface-melted during processing of the fibrous web by heating. Alternatively, these binder fibers do not melt, but begin to partially dissolve in the solvent used for the manufacturing process (i.e. water) and become tacky. The tacky or softened binder fibers are therefore capable of internally binding the fibers of the web by adhering to the fibers and structurally strengthening the thus obtained fiber web. The average fiber diameter of these binder fibers may preferably be in the range of about 2 to 20 um such as 10 um and the average fiber length of these binder fibers may preferably be in the range of about 2 to 12 mm, such as about 6 mm. The amount of such fibers may be 0.1 to 25% by weight, preferably about 0.5 to 20% by weight, such as 2% by weight, based on the total weight of fibers.

The present web optionally includes at least one additive which is common in the art. The at least one additive may be selected from a flame-retardant agent, a coloring agent, a hydrophobic agent, a hydrophilic agent, a wetting agent, an antimicrobial agent or an antistatic agent.

In an embodiment, the fibrous media may further comprise a nanofiber coating made of nanofibers, in particular electrospun nanofibers such as those selected from polyethersulfone (PES) or polyamide (PA) nanofibers. The nanofiber coating may preferably have a thickness of about 50 to 1000 nm. The nanofiber coating may preferably have a loading of about 0.5 to 5.0 $g/m^2$. The nanofibers may preferably have an average fiber diameter of about 50 to 500 nm such as about 100 to 300 nm. Preferably, the nanofiber coating may be applied on top of the fibrous web being impregnated with the thermoset binder.

The fibrous media is prepared generally by mixing fibers of at least one first fibrous component, optionally with at least one binder fiber and/or at least one additive, to form a fibrous web. The process is disclosed in more detail in example 1.

According to a preferred embodiment the fibrous web of the present disclosure further has the following properties:
  the basic weight between 50 and 400 gsm;
    an air permeability for oil application of between 2 and 600 cfm/sf; and
    a burst strength after 500 hours in hot oil having e.g. a temperature of 140° C. of at least 20 psi.

Unless otherwise indicated, all parameters of the fibrous web described herein were determined according to the tests methods described below in the examples.

Furthermore, typical properties of the fibrous media are the following at a caliper (TMI) of 20 to 60 mils:
  burst strength, dry (saturated and dried web, SD) typically 25 to 90 psi, in particular 28.5 to 85.0 psi;
  burst strength, wet (saturated and dried web, SD) typically 10 to 90 psi, in particular 12 to 82.0 psi;
  500 hour hot oil burst 20 to 50 psi.

Furthermore, typical properties of the fibrous media are the following at a caliper (TMI) of 20 to 60 mils:
  burst strength, dry (saturated, dried and cured web, SDC) typically 30 to 80 psi;
  burst strength, wet (saturated, dried and cured web, SDC) typically 30 to 90 psi.

In an embodiment, stiffness (machine direction, MD, saturated and dried, SD) of a filter media having a caliper of 20 to 60 mils is typically 3,300 to 10,000 mg, in particular about 5,000 to 8,000 mg.

In an embodiment, stiffness (machine direction, MD, saturated, dried and cured, SDC) of a filter media having a caliper of 20 to 60 mils is typically 3,200 to 16,800 mg.

In an embodiment, filtering efficiency of a web having a caliper of 20 to 60 mils against particles having a particle size of 15 microns is: 20 to 99%, in particular about 25 to 98%. Dirt holding capacity: 70 to 150 $mg/in^2$, in particular 95 to 145 $mg/in^2$.

"Saturated and dried" stands for a medium having a total content of volatiles of less than 7% by weight at room temperature, based on the total weight of the medium.

"Saturated, dried and cured" stands for a medium having a total content of volatiles of less than 7% by weight at room temperature, based on the total weight of the medium which has been fully cured.

A method of making a filter media of any of the above-discussed embodiments comprises typically the steps of
  forming a wet laid web from a fibrous slurry comprised of synthetic fibers and optionally at least one additive and/or at least one binder fiber in water;
  drying the web to a low moisture content, preferably a moisture content of 2% or less;
  contacting the dried web with a composition of a thermoset binding agent in a liquid phase to bond the fibers together with the thermoset binder;
  removing the liquid phase to form a web;
  optionally pre-curing and/or corrugating the web; and
  pleating the web, optionally followed by a final curing step.

The concentration (solid matter) of the binding agent in the liquid phase composition is suitably about 10 to 50% by weight, based on the total weight of the liquid phase composition.

In the step of contacting the dried web with a binding agent, the dried web is preferably saturated with a liquid composition of the thermoset binding agent on one or both sides. After the saturation step, the liquid phase, i.e. the solvent or dispersing agent, of the composition is removed. For removing the liquid phase the medium is preferably heated.

Optionally, the dried medium may be pre-cured by an additional heating step prior to pleating and/or corrugation. "Pre-curing" refers to a partial curing of the thermoset binder resin up to e.g. 65% or 100%.

The liquid phase of the binding agent composition is, in one embodiment, removed such that the volatiles content is reduced to less than 10 wt.-%, in particular less than 8 wt.-%, calculated from the total weight of the treated web prior to optional corrugation.

The content of volatiles refers to the amount of volatile components left in the web at ambient (room) temperature.

The media can be optionally corrugated. In one embodiment, the corrugation may be formed after impregnation of the fibrous web with a thermoset binder by heating (or drying) the fibrous web to approximately 180-220° C. between resin coating rolls and corrugation rolls, followed by heating (or drying) the thus obtained corrugated fibrous media below 80° C. in order to prevent the collapse of the corrugation by high heating. Corrugation techniques are commonly known in the art.

The manufacturing method is examined in more detail in connection with Example 1.

The media can be pleated and optionally fully cured as described in more detail in Example 3.

A fibrous media according to the present technology is capable of forming a self-supporting oil filter media which retains its pleats and corrugations during periods of normal operation.

Typically, the present media is capable of retaining the pleats and optionally corrugations even upon a contact with oil, in particular oil having a temperature of up to about 140° C. Thus, the self-supporting, pleated and optionally corrugated oil filter media is capable of retaining pleats and optional corrugations upon contact with oil having a temperature in the range encountered in a combustion engine such as 125 to 135° C.

As preliminarily discussed above, it is known that e.g. heavy duty diesel engines may have internal cracks in the gaskets within their cooling system which gives rise to a leaking of the ethylene glycol of the coolant into the lube oil of the lubrication system. The combination of glycol with hot oil may have a dramatic influence on synthetic filter media, i.e. these media may lose their integrity and may even dissolve completely in the oil glycol mixture at elevated engine operating temperature.

By contrast, in the present invention it was observed that the solubility of the fiber media according to the invention in glycol oil mixture is reduced or completely eliminated when the fibers are impregnated or coated with a binder selected from the group of thermoset binder resins like melamine-based resins, such as melamine formaldehyde.

According to an embodiment, the present disclosure concerns an oil filter comprising a self-supporting pleated and optionally corrugated fibrous media according to the present disclosure. The filter according to the present disclosure is especially suitable for use in lube oil systems because of its high temperature integrity. A "filter" refers to a filter device (or filter arrangement) comprising the filter media as defined above being pleated and optionally corrugated and being disposed between a pair of end plates in such a manner so as to form a hollow cylinder. However, the filter according to the present disclosure can be used also e.g. for gas turbine and clean room applications.

According to another embodiment, the web of the present disclosure may be used in a laminated media product. Since the fibrous media according to the present disclosure contains a very high percentage of synthetic fibers, it is bondable to other materials in a lamination process using heat bonding, ultrasonic bonding, etc. It may also be laminated using standard water-based or hot-melt glues.

The examples below discuss the production of filter media according to the invention.

Figure 2:
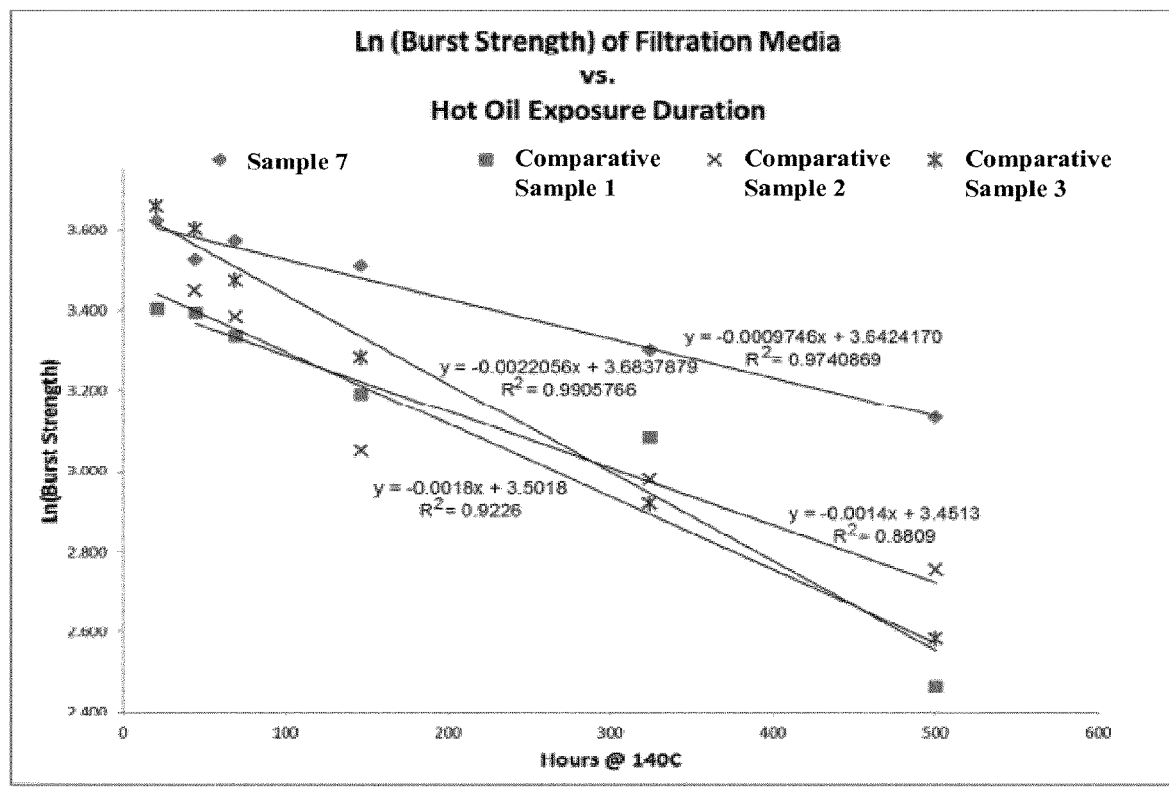
FIG. 2 shows the natural logarithm (ln) of the hot oil burst strength of a non-limiting exemplary fibrous medium of the present invention (♦) and typical wood pulp containing media (■, x, X), as a function of time, thereby demonstrating the beneficial hot oil durability of the fibrous media according to the invention (the conditions for this hot oil ageing are described in the test methods below)

FIG. 2 shows the natural logarithm (ln) of the hot oil burst strength of (i) an exemplary web of the present disclosure and (ii) standard oil media as a function of time. The slope of the natural logarithm (ln) burst graph shown in FIG. 2 is considered to be the degradation rate of the media. The slope of the media according to the present disclosure is half of that of wood pulp-containing prior art media. Accordingly, the media according to the present disclosure has higher burst strength for a significantly longer period of time on exposure to hot engine oil when compared to a wood pulp-containing media.

It was observed that the groove depth (or corrugation depth) of the media according to the present disclosure is stable in hot engine oil and is directly comparable to the groove depth retention in a typical wood pulp-containing media. It is also observed that the relatively heavy basis weight of the fibrous media according to the present disclosure, coupled with the relatively high % resin content of the sheet (e.g. at least 15% or 25% resin content) and the use of a phenolic resin system all combined to give the media excellent grooving and pleating characteristics as well as high durability in hot oil.

EXAMPLES

Test Methods

Basis Weight: The basis weight is measured according to TAPPI Standard T 410 om-02 and reported in grams per square meter (gsm).

Caliper or Thickness: The caliper or thickness of the media is determined according to TAPPI Standard T 411 om-05 using a Thwing Albert 89-100 Thickness Tester.

Corrugation Depth is the difference between the caliper of the flat sheet of media and the thickness of the sheet after corrugating the media.

Air Permeability: The air permeability, or "air perm", of the media is measured according to TAPPI Standard T 251 cm-85 ("Air Permeability of Porous Paper, Fabric and Pulp Handsheets) with 0.5 inch (2.7 mm) water differential using a Textest AG (model FX3300) and reported as the rate of the flow of air in cubic feet per square foot of sample area per minute (cfm/sf), sometimes referred to as cfm. Air Perm may also be referred to as porosity, Frazier or Textest.

Burst Strength: The wet and dry burst strength is measured according to TAPPI Standard T 403 om-22 ("Bursting Strength of Paper") and reported in $kg/cm^2$.

Stiffness of the media was determined according to TAPPI T 489 om-92 using a Gurley bending resistance tester MOD 4171D (Gurley Precision Instruments).

Pore Size: The size of the pores in the media was determined using a bubble point method according to ASTM 316-03 (2011) utilizing a Porometer G3 Series (Quantachrome Instruments) and reported in microns (µm).

Void fraction was determined by an imbibition method by immersing the filter to be analyzed, under vacuum, in n-butyl alcohol that wets the pores (filter size: 40 mm×40 mm; vacuum pump: 0.133 Pa (ultimate pressure), 50 L/min exhaust rate; use a direct-reading balance having a resolution of at least 0.1 mg).

Dust Holding Capacity/Particle Removal Efficiency: Following ISO 4548-12 for lube oil filtration using a Multipass system, the DHC (Dust Holding Capacity) and particle removal efficiency was determined for the media. The media is tested as a flat sheet with a test flow of 0.5 L/min, particle injection flow of 250 mL/min, BUGL (Basic Upstream Gravimetric Level) of 60 mg/L (ISO Medium Test Dust), a terminal pressure drop of 12.3 psi, a circular shaped sample test diameter of 6.375 inches, and a face velocity of 3.624 inches per minute.

Hot Oil Ageing, in order to determine the hot oil burst strength, is done by placing a media sample (size: 14×10 cm) into an oil bath of typical engine oil (e.g. Mobil 1) maintained at 140 C+/−0.1° C. for 500 hr. "Hot oil burst strength" of a media sample is defined as the maximum hydrostatic pressure required to result in rupture of the media sample when a controlled and constantly increasing pressure is applied through a rubber diaphragm to an area of 7.07 $cm^2$. The media sample is then removed, cooled for about 5 minutes, and excess oil is blotted from the sample. Then, the moisture free sample is tested using a Mullen burst strength tester. The results are reported in force per unit area at failure (e.g. $kg/cm^2$ or psi).

Unless otherwise indicated, the unit "um" corresponds to "µm" or micron.

Manufacture of Filter Material (Example 1)

The production process for making a filtration media comprises for example a wet-laid process. In such a process, the fibrous material is first disintegrated for example in a hydropulper optionally in the presence of a fiber dispersant chemical additive such as a surfactant for keeping the fibers separated when added and to prevent the fibers from entangling during handling. If microglass is being disintegrated, the pH of the hydropulper may also be adjusted to a pH in the range of 2 to 5 using an acid in order to prevent the microglass fibers from clumping together and to promote even dispersion of the microglass fibers. Fibers of each desired variety are then added to the hydropulper in their respective correct proportion according to the furnish recipe. A consistency (fiber weight to water volume) of about 1 to 10%, in particular about 5% is preferred at the mixing stage.

After an optional refining stage, the fiber furnish is then diluted down to a consistency of about 0.01-0.02% and formed into a web on a paper machine wire. A single layer or multiple layer headbox design may be employed. If a multiple layer headbox design in employed, more than one designed furnish blend may be deposited in series onto the paper machine wire, thereby creating a multi-layer wet-laid composite.

Once on the paper machine wire, the water content of the wet-laid furnish is drained through the moving paper machine wire by a series of hydrofoils and vacuum boxes until the percent solids content of the sheet is approximately 30 to 40 wt-%. In a subsequent dryer section, the web is dried to approximately a moisture content of 2% or less.

The binder resin is then introduced to the sheet, preferably at a saturator machine. The resin may be applied on either one or both sides of the sheet. The process may be adjusted to achieve either 1- or 2-sided saturation of the sheet. The solids content of the resin bath applied to the sheet is typically between 20 to 40 wt-%. The resin bath solids content is chosen based on multiple processing (equipment) and application (into the web) considerations. Besides the solids content, the balance of the resin bath composition is a solvent such as methanol, water, and/or other solvent components.

After the resin is applied to the sheet, the solvent is liberated by heating the web to an elevated temperature such that the solvent evaporates at a rate fast enough to accommodate the desired production throughput. Heating may involve the use of steam cans, ovens, a combination of both, and/or other heating technologies. The obtained media may be referred to as being "saturated and dried (SD)".

After the solvent removal, the media may be pre-cured by heating to an elevated temperature such that the binder resin partially (e.g. to 25-65%) and/or completely cures. Heating may involve the use of steam cans, ovens, a combination of both, and/or other heating technologies. The thus obtained media being completely cured may be referred to as being "saturated, dried and cured (SDC)".

During this drying process groove patterns (corrugation), if applicable, can be also imparted on the sheet. This may be most preferably done by calendering the resulting wet-laid fibrous sheet under heat (up to 220° C.) and pressure using both top and bottom hot smooth rolls, thereby preferably adjusting the obtained sheet's void fraction in the range of approximately 70-95%, such as 80-90% which is beneficial for corrugation. The percent volatiles content is reduced in the drying process to a predetermined level of about 1 to 10%, in particular to about 4 to 6%, by weight of the web.

Compositions of exemplary media (Samples 1 and 2) according to the present disclosure are shown in Table 1.

TABLE 1

Summary of furnish compositions Samples 1 and 2

| Fiber | Sample 1 | Sample 2 |
|---|---|---|
| 4 mm "PVOH fiber", average fiber diameter: 10 μm (binder fiber) | 2.0% by weight | — |
| glass fibers, average fiber diameter: 0.65 μm | 4.0% by weight | 10.0% by weight |
| glass fibers, average fiber diameter: 2.44 μm | 16.5% by weight | 10.0% by weight |
| PET 0.3 D * 5 mm, average fiber diameter: 5.5 μm | 16.4% by weight | 30.3% by weight |
| PET 0.8 D * 5 mm | — | 11.0% by weight |
| PET 0.8 D * 6 mm, average fiber diameter: 9.06 μm | 6.6% by weight | — |
| Lyocell 1.7 Dt * 4 mm, unfibrillated, average fiber diameter: 11.5 μm | 34.5% by weight | — |
| Undrawn PET 1.6 D * 5 mm | 20.0% by weight | 38.7% by weight |
| Resin content | 25% by weight phenolic (phenol formaldehyde resin) | 25% by weight melamine |
| Cellulosic content | 34.5% by weight | — |
| Glass content | 20.5% by weight | 20.0% by weight |
| Total content of thermoplastic fibers | 45.0% by weight | 80.0% by weight |

Properties of the exemplary webs according to the present disclosure are shown in Table 2.

TABLE 2

Properties of exemplary webs (Samples 1 and 2)

| | Unit | Sample 1 | Sample 2 |
|---|---|---|---|
| Basis weight (SD) | lb/3000 ft$^2$ | 162.0 | 114.7 |
| | g/m$^2$ | 263.6 | 186.6 |
| Basis weight (SDC) | lb/3000 ft$^2$ | 150.8 | 109.3 |
| | g/m$^2$ | 245.4 | 177.8 |
| Textest air permeability | cfm | 39.8 | 28.8 |
| TMI Caliper (or thickness) | mils | 52.3 | 36.2 |
| | mm | 1.33 | 0.92 |
| Groove (or corrugation) depth (see FIG. 5) | mils | 18.0 | 5.0 |
| | mm | 0.46 | 0.13 |
| Mean pore (manual) | μm | 18.2 | 15.6 |
| Burst - dry, SD | psi | 28.5 | 80.0 |
| Burst - wet, SD | psi | 18.5 | 65.0 |
| Burst - dry, SDC | psi | 36.0 | 74.0 |
| Burst - wet, SDC | psi | 48.0 | 67.0 |
| Stiffness, MD SD | mg | 4 900 | 7 900 |
| Stiffness, MD SDC | mg | 9 100 | 6 800 |
| Particle removal efficiency against particles having a particle size of 15 microns | % | 81.9 | 96.2 |
| Dirt holding capacity (DHC) | mg/in$^2$ | 144.1 | 100.9 |
| | mg/cm$^2$ | 22.3 | 15.6 |
| 500 hour hot oil burst (Hot Oil Ageing) | psi | 23.3 | 43.0 |
| | kPa | 160.9 | 297 |
| | kgf/cm$^2$ | 1.64 | 3.02 |

Example 2 (Samples 3-6)

Using the method described in Example 1, filter media impregnated with melamine resin were produced (Samples 3-6). For Samples 5 and 6, an additional calendaring step for adjusting the void fraction to a range of about 70-95%, as discussed above, was used for preparing the corrugated filter media. Corrugation on the sheet was imparted during the drying process at a temperature of about 180-220° C., followed by a temperature below 80° C. after the corrugation was completed. The compositions of Samples 3-6 are given in Table 2a below.

The properties of the filter media thus obtained are indicated in Tables 3 and 4. The medium of Sample 3 is suitable for, e.g., motorcycle fuel media filters. The medium of Sample 4 is self-supporting, washable and plain e.g. flat. It is suitable for, e.g., lube (oil) and air applications. The medium of Sample 5 is self-supporting, washable and corrugated and suitable for, e.g., lube (oil) and air applications.

TABLE 2a

Summary of furnish compositions Samples 3, 4, 5 and 6

| Fiber | Sample 3 | Sample 4 | Sample 5 | Sample 6 |
|---|---|---|---|---|
| Glass fibers, average fiber diameter: 0.65 μm | 8.0% by weight | 10.0% by weight | 10.0% by weight | — |
| Glass fibers, average fiber diameter: 0.53 μm; | — | — | — | 8.0% by weight |
| Glass fibers, average fiber diameter: 2.44 μm | — | 10.0% by weight | 10.0% by weight | 13.3% by weight |
| PET 0.05 D * 6 mm | 8.9% by weight | — | — | — |
| PET 0.3 D * 5 mm, average fiber diameter: 5.5 μm | 17.8% by weight | 30.3% by weight | 30.3% by weight | 43.7% by weight |
| PET 0.8 D * 5 mm | 17.8% by weight | 11.0% by weight | 11.0% by weight | — |
| PET 1.4 D * 6 mm | 8.9% by weight | — | — | — |
| PET 3.0 D * 5 mm | 8.9% by weight | — | — | — |
| Undrawn PET 1.6 D * 5 mm | 29.7% by weight | 38.7% by weight | 38.7% by weight | 35.0% by weight |
| Resin content (=amount of resin based on the total weight of the fibrous media) | 18.5% by weight melamine | 21.9% by weight melamine | 17% by weight melamine | 23% by weight melamine |
| Glass content | 8.0% by weight | 20.0% by weight | 20.0% by weight | 20.0% by weight |
| Total content of thermoplastic fibers | 92.0% by weight | 80.0% by weight | 80.0% by weight | 80.0% by weight |

TABLE 3

Properties of Filter Media (Samples 3, 4 and 5).

| Physical properties | | | | Sample 3 | Sample 4 | Sample 5 |
|---|---|---|---|---|---|---|
| Mass per unit area (basis weight) | | g/m² | SD | 216.8 | 199.8 | 187.2 |
| | | | SDC | 208.3 | 193.2 | 181.7 |
| Thickness | 20 kPa | mm | Total | — | — | 1.008 |
| | | | Caliper | 1.334 | 1.098 | 0.893 |
| Corrugation depth | | mm | | — | — | 0.115 |
| Air permeability | 125 Pa | cfm/sq.ft | | 32.1 | 30.8 | 28.5 |
| Burst Strength, dry | | kgf/cm² | SD | 3.19 | 4.87 | 4.22 |
| | | psi | | 45.4 | 69.3 | 60.0 |
| Pore Size | | μm | Max | 63.9 | 44.0 | 47.4 |
| | | | Mean | 54.6 | 39.7 | 41.8 |
| Stiffness | | mg | SD | 5957 | 9778 | 4801 |
| Dirt holding capacity | | mg/in² (mg/cm²) | | 74.1 (11.48) | 73.7 (11.42) | 90.8 (14.07) |

The properties of the filter medium of Sample 6 are indicated in Table 4. The medium is self-supporting, pleatable and corrugated.

TABLE 4

Properties of exemplary Filter Medium (Sample 6).
Overall filtration efficiency (ISO 4548-12)
against particles having the following particle size:

| >10 μm | 96.6% |
|---|---|
| >12 μm | 99.1% |

TABLE 4-continued

Properties of exemplary Filter Medium (Sample 6).
Overall filtration efficiency (ISO 4548-12)
against particles having the following particle size:

| >15 μm | 99.9% |
|---|---|
| >17 μm | 100.0% |
| >20 μm | 100.0% |

TABLE 4-continued

Properties of exemplary Filter Medium (Sample 6).
Overall filtration efficiency (ISO 4548-12)
against particles having the following particle size:

| >25 μm | 100.0% |
|---|---|
| >30 μm | 99.9% |
| >40 μm | 99.9% |
| Corrugation depth | 0.15-0.6 mm |

Example 2a

Using the method described in Example 1, a filter medium comprising a binder fiber and being impregnated with melamine resin (Sample 7) or a filter medium comprising a binder fiber (Samples 8 to 9) was produced. The compositions of Samples 7-9 and Comparative Samples 1-3 are given in Tables 5 and 6 below.

TABLE 5

Summary of furnish compositions Sample 7 and Comparative Samples 1-3 (see also FIG. 2)

| Fiber | Sample 7 | Comparative Sample 1 | Comparative Sample 2 | Comparative Sample 3 |
|---|---|---|---|---|
| Softwood fibers | — | 57.0% by weight | 70.7% by weight | 31.7% by weight |
| Hardwood fibers | — | 13.3% by weight | 3.0% by weight | 50.7% by weight |
| Glass fibers, average fiber diameter: 2.44 μm | 15.5% by weight | — | 2.3% by weight | — |
| Glass fibers, average fiber diameter: 0.65 μm | — | — | 6.0% by weight | 3.3% by weight |
| PET 0.3 D * 5 mm, average fiber diameter: 5.5 μm | 33.2% by weight | — | — | — |
| PET 0.8 D * 6 mm | 10.3% by weight | — | — | — |
| Reliance 1.5 d × ¼" polyester | — | 30.0% by weight | 18.0% by weight | 14.3% by weight |
| Lyocell 1.7 Dt * 4 mm, unfibrillated, average fiber diameter: 11.5 μm | 31.5% by weight | — | — | — |
| Binder PET 2.0 D * 6 mm (binder fiber) | 9.5% by weight | — | — | — |
| Resin content (=amount of resin based on the total weight of the fibrous media) | 25% by weight phenolic | 26.0% by weight phenolic | 22.0% by weight phenolic | 18.0% by weight phenolic |
| Cellulosic pulp content | — | 60.0% by weight | 73.7% by weight | 82.4% by weight |
| Glass content | 15.5% by weight | — | 8.3% by weight | 3.3% by weight |
| Total content of thermoplastic fibers | 84.5% by weight | 30.0% by weight | 18.0% by weight | 14.3% by weight |

The hot oil burst strength properties of the filter media thus obtained (Sample 7 and Comparative Samples 1-3) are shown in FIG. 2.

TABLE 6

Summary of furnish compositions Samples 8-9.

| Fiber | Sample 8 | Sample 9 |
|---|---|---|
| PET 0.06 Dt * 3 mm | 14.8% by weight | 14.8% by weight |
| PET 0.3 D * 5 mm, average fiber diameter: 5.5 μm | 65.6% by weight | 65.6% by weight |
| Binder 4.0 D * 6 mm (bicomponent binder fiber) | 19.7% by weight | 19.7% by weight |
| Nano fiber coating | PES (thermoplastic, 50-1000 nm) | PA (thermoplastic, 50-1000 nm) |
| Resin content | acrylic resin, 7% by weight | acrylic resin, 7% by weight |
| Glass content | — | — |
| Total content of thermoplastic fibers | 100.0% by weight | 100.0% by weight |

Example 3: Pleating of Material

The material can be pleated to provide a suitable self-supporting, pleated, stand-alone structure.

In the pleating process the media is loaded between two rollers. The nip gap between the roller and the scoring head between the nip gap helps to form the fold mark for the pleat. The pleat is formed by the forward movement of the media post fold mark. The fold is then made to move through a preheating zone at 150 to 160° C. with a very short residence time 15-120 sec.

The folded media can then be allowed to pass through an oven to complete residual cure at 180° C. or higher for a residence time of 5-10 min. The curing oven is optional and used only if the media is uncured or partially cured at the previous stage.

The pleatability of a material can be assessed by the pleat angle which will reflect the extent or ease of forming a pleat.

On the other hand, an important feature of the present invention is the combination of ease of pleat forming during manufacturing of the fibrous media and pleat-retention upon contact with hot oil.

An exemplary pleated self-supporting web according to present disclosure processed as described above is shown in FIG. 3, wherein reference numeral 11 refers to the pleated material.

The specific examples provided in the description given above and the specific embodiments provided below should not be construed as limiting the scope and/or the applicability of the appended claims.

SPECIFIC EMBODIMENTS

Further specific embodiments and suitable feature combinations thereof are described below:
1. A fibrous media suitable for an oil filter comprising a fibrous web formed from, or comprising, (i) synthetic fibers; (ii) optionally at least one additive; (iii) a thermoset binder present at a concentration of at least 15 wt-% by weight of the fibrous web and/or (iv) at least one binder fiber. Most preferably, the fibrous web does not include regenerated cellulosic fibers such as Lyocell or viscose or combinations thereof. The at least one binder fiber preferably comprises an amount of 2 to 25 wt.-%, based on the total weight of the fibers. The synthetic fibers comprise up to 40 wt.-%, preferably up to 30 or up to 20 wt.-%, glass fibers, based on the total weight of the fibers. Preferably, the synthetic fibers comprise up to 70 wt.-%, preferably up to 80 wt.-%, thermoplastic fibers, based on the total weight of the fibers. Preferably, said thermoplastic fibers comprise undrawn thermoplastic fibers, preferably in an amount of 15 to 50 wt.-%, such as 20 to 40 wt.-% by weight, based on the total weight of the fibers. The synthetic fibers are internally bonded with the thermoset binder and/or the binder fiber to form the fibrous web. The thus obtained fibrous media may be capable of forming a self-supporting, optionally corrugated and pleated oil filter which is preferably capable of retaining pleats and optional corrugations upon contact with oil having a temperature in the range encountered in a combustion engine. Preferably, this fibrous media does not contain natural wood pulp.

2. The fibrous media according to embodiment 1, comprising synthetic fibers selected from the group of thermoplastic polymers, silicious fibers, such as glass fibers, regenerated cellulosic fibers and mixtures thereof, at least 30 wt-%, preferably at least 50 wt-%, more preferably at least 80 wt.-%, of the fibers being thermoplastic polymers.

3. The fibrous media according to embodiment 1 or 2, wherein the fibrous web contains (i) at least 70 wt-% fibers such as at least 80 wt-% of thermoplastic polymer(s) and up to 40 wt-% such as up to 30 wt-% regenerated cellulosic fibers. An alternative embodiment is the fibrous media according to embodiment 1 or 2, wherein the fibrous media contains (ii) at least 70 wt-% fibers of thermoplastic polymer(s). Another alternative embodiment is the fibrous media according to embodiment 1 or 2, wherein the fibrous media contains no regenerated cellulosic fibers such Lyocell or viscose or combinations thereof.

4. The fibrous media according to any of the preceding embodiments, comprising a fibrous web impregnated with the thermoset binder.

5. The fibrous media according to any of the preceding embodiments, wherein the binder fiber is selected from a bicomponent binder fiber, a polyethylene terephthalate (PET) binder fiber or a polyvinyl alcohol (PVOH) binder fiber. Preferably, the amount of these binder fibers is 0.1 to 25 wt.-% such as 1 to 20 wt.-% or 2 to 10 wt.-%, based on the total weight of fibers.

6. The fibrous media according to any of the preceding embodiments, wherein the at least one additive is selected from a flame-retardant agent, a coloring agent, a hydrophobic agent, a hydrophilic agent, a wetting agent, an antimicrobial agent or an antistatic agent.

7. The fibrous media according to any of the preceding embodiments, comprising 15 to 30 wt.-%, in particular 20 to 25 wt.-%, of the thermoset binder, based on the total weight of the synthetic fibers.

8. The fibrous media according to any of the preceding embodiments, wherein the thermoset binder is selected from thermoset resins, such as phenolic resins, epoxy resins or melamine-based polymers, such as melamine formaldehyde, or acrylic resins, or combinations thereof.

9. The fibrous media according to any of the preceding embodiments, comprising synthetic fibers comprising first fibers, having a first average diameter such as e.g. less than 1 um, and second fibers, having a second average diameter such as e.g. 2 um or more, the first average diameter being less than the second average diameter. Preferably, said synthetic fibers are glass fibers. The weight ratio of the two groups of fibers may be 1:100 to 100:1, in particular about 1:10 to 10:1.

10. The fibrous media according to any of the preceding embodiments, wherein the synthetic fibers comprise undrawn fibers such as undrawn thermoplastic polyethylene terephthalate fibers, preferably in an amount of 15 to 50% by weight, more preferably 30 to 40% by weight, based on the total weight of fibers.

11. The fibrous media according to any of the preceding embodiments, wherein the thermoplastic fibers are selected from the group of polyesters, for example polyalkylene terephthalates, such as polyethylene terephthalate (PET), polybutylene terephthalate (PBT) and the like, polyalkylenes, for examples polyethylenes, polypropylenes and the like, polyacrylonitriles (PAN), and polyamides, for example nylons, such as nylon-6, nylon 6,6, nylon-6,12, and the like, and combinations thereof, in particular a majority of the synthetic fibers comprises polyester fibers such as preferably more than 70% or even more than 75% of the synthetic fibers.

12. The fibrous media according to any of the preceding embodiments, wherein the synthetic fibers comprise thermoplastic synthetic fibers having an average fiber diameter from 0.1 um to 15 um, such as 1 to 10 um and an average fiber length from 1 to 20 mm, such as 1 to 10 mm or 1 to 7 mm.

13. The fibrous media according to any of the preceding embodiments, wherein the glass fibers have an average fiber diameter of 0.4 to 2.6 um.

14. The fibrous media according to any of the preceding embodiments, wherein the synthetic fibers include up to 40% by weight or up to 30% by weight or up to 20% by weight or even only up to 10% by weight, based on the total weight of the fibers, of a regenerated cellulosic material, such as Lyocell or viscose or combinations thereof.

15. The fibrous media according to any of the preceding embodiments, wherein the fibers consist essentially of fibers of a synthetic material having a glass transition point or melting point greater than 130° C., in particular greater than 150° C.

16. The fibrous media according to any of the preceding embodiments, wherein the fibrous media has an average thickness of 0.6 to 1.5 mm, in particular 0.7 to 1.4 mm.

17. The fibrous media according to any of the preceding embodiments, wherein the fibrous web is corrugated, preferably by a corrugation depth of about 0.1 to 0.5 mm.

18. The fibrous media according to any of the preceding embodiments, wherein the fibrous media further comprises a nanofiber coating, wherein the nanofiber coating includes nanofibers, such as polyethersulfone (PES) or polyamide (PA) nanofibers. Preferably, the nanofiber coating's thickness is 50 to 1000 nm. Preferably, the nanofibers have an average fiber diameter of 50 to 500 nm such as 100 to 300 nm. Preferably, the nanofibers are applied using electrospinning. Preferably, the nanofiber coating is applied on top of the fibrous web being impregnated with the thermoset binder.

19. The fibrous media according to any of the preceding embodiments, wherein the fibrous web is wet-laid.

20. The fibrous media according to any of the preceding embodiments, wherein
the basic weight of the fibrous web is between 50 and 400 gsm such as 100 to 250 gsm;
the (air) permeability of the fibrous web for oil is between 2 and 600 cfm/sf; and
the hot oil burst strength of the fibrous web after 500 hours in 140 C hot oil is at least 20 psi or at least 30 psi.

21. The fibrous media according to any of the preceding embodiments, wherein
the fibers of the thermoplastic polymer form 60% to 88% of the fibrous web by weight;
the glass fibers form 2% to 30% of the fibrous web by weight; and the fibrous web further comprises a coating made of the thermoset binder composed of a phenolic resin, an acrylic resin, an epoxy resin or a melamine formaldehyde, wherein the amount of the binder is from 15% to 30 wt.-% by weight of the fibrous web.

22. The fibrous media according to any of the preceding embodiments, wherein said fibrous media exhibits at a caliper of 20 to 60 mils at least one, preferably a combination of two, in particular all three, of the following parameters:
 a stiffness (SD), in machine direction, of 3,300 to 10,000 mg, in particular about 5,000 to 8,000 mg;
 a filtering efficiency against 15 micron particles of: 20 to 99%, in particular about 25 to 98%; and
 a dirt holding capacity of 70 to 150 mg/in$^2$, in particular 95 to 145 mg/in$^2$.

23. The fibrous media according to any of the preceding embodiments, wherein the fibers consist of synthetic fibers only.

23. A method of making a filtration media or the fibrous media of embodiments 1 to 22, comprising
 forming a wet laid web from a fibrous slurry comprising synthetic fibers, optionally at least one binder fiber and optionally at least one additive, in water;
 drying the web to a moisture content of 2% or less;
 contacting the dried web with a composition of a thermoset binding agent in a liquid phase to bond the fibers together with the thermoset binder; and
 removing the liquid phase to form the fibrous media;
the fibrous media thus obtained being capable of forming a self-supporting, pleated oil filter media which is capable of retaining pleats upon contact with oil having a temperature in the range encountered in a combustion engine.

24. The method according to embodiment 23, wherein the dried web is saturated with a liquid composition of the thermoset binding agent on one or both sides, and subsequently the liquid phase of the composition is removed in particular by heating the web.

25. The method according to embodiment 24, wherein, during the removal of the liquid phase of the composition in particular by heating the web the web is pre-cured and/or a corrugation pattern is applied on the web.

26. The method according to any of embodiments 23 to 25, wherein the fibrous media is pleated, and optionally fully cured, thereby forming the self-supporting, pleated oil filter.

27. The method according to embodiments 23 to 26, wherein the liquid phase of the binding agent composition is removed such that the volatiles content is reduced to less than 10 wt-%, in particular less than 8 wt-%, calculated from the total weight of the treated web.

28. The method according to any of embodiments 23 to 27, wherein the media comprises at least 15 wt.-%, preferably 15 to 30 wt.-%, in particular 20 to 25 wt.-%, of a thermoset binder, based on the total weight of the fibers.

29. The method according to any of embodiments 23 to 28, wherein the thermoset binder is selected from thermoset resins, such as phenolic resins, epoxy resins or melamine-based polymers, such as melamine formaldehyde, or acrylic resins, and combinations thereof.

30. The method according to any of embodiments 23 to 29, wherein the thermoplastic fibers are selected from the group of polyesters, for example polyalkylene terephthalates, such as polyethylene terephthalate (PET), polybutylene terephthalate (PBT) and the like, polyalkylenes, for examples polyethylenes, polypropylenes and the like, polyacrylonitriles (PAN), and polyamides, for example nylons, such as nylon-6, nylon 6,6, nylon-6,12, and the like, and combinations thereof.

31. The method according to any of embodiments 23 to 30, wherein said media exhibits at a caliper of 20 to 60 mils at least one, preferably a combination of two, in particular all three, of the following parameters:
 a stiffness (SD), in machine direction, of 3,300 to 10,000 mg, in particular about 5,000 to 8,000 mg;
 a filtering efficiency for 15 micron particles of: 20 to 99%, in particular about 25 to 98%; and
 a dirt holding capacity of 70 to 150 mg/in$^2$, in particular 95 to 145 mg/in$^2$.

32. A filtration media or a fibrous media obtainable by the method according to any one of embodiments 23 to 31.

33. An oil filter comprising (i) the fibrous media according to any of embodiments 1-22 or (ii) the filtration media or the fibrous media according to embodiment 32.

34. The oil filter according to embodiment 33, wherein the oil filter media is pleated and optionally corrugated.

35. Use of a thermoset resin for preventing damage of the oil filter according to embodiments 32 to 34 caused by a combination of oil and antifreeze agents and decomposition products thereof.

All possible combinations of embodiments, specific embodiments, aspects and/or features of the invention as described above are also disclosed herewith.

What is claimed is:

1. A fibrous media comprising a fibrous web formed from:
 synthetic fibers; and
 a thermoset binder present at a concentration of at least 15 wt-% by weight of the fibrous web;
wherein the synthetic fibers are bonded with the thermoset binder to form the fibrous web; the fibrous media is in the form of a self-supporting, pleated filter; and the fibrous media is not reinforced with an additional mechanical support layer.

2. The fibrous media according to claim 1, wherein the synthetic fibers are selected from the group consisting of thermoplastic polymer fibers, regenerated cellulosic fibers and mixtures thereof; and at least 30 wt.-% of the synthetic fibers are thermoplastic polymer fibers.

3. The fibrous media according to claim 2, wherein the fibrous web contains:
 i. at least 70 wt.-% fibers of thermoplastic polymer(s) and up to 40 or up to 30 wt.-% regenerated cellulosic fibers;
 ii. at least 70 wt.-% fibers of thermoplastic polymer(s); or
 iii. no regenerated cellulosic fibers.

4. The fibrous media according to claim 2, wherein the thermoplastic polymer fibers are selected from the group consisting of polyesters, polyalkylenes, polyacrylonitriles (PAN), polyamides, and combinations thereof.

5. The fibrous media according to claim 1, wherein the fibrous web is impregnated with the thermoset binder.

6. The fibrous media according to claim 1, wherein the fibrous media comprises between 15 to 30% of the thermoset binder based on the weight of the synthetic fibers.

7. The fibrous media according to claim 1, wherein the thermoset binder is selected from the group consisting of thermoset resins, epoxy resins, melamine-based polymers, acrylic resins, and combinations thereof.

8. The fibrous media according to claim 1, wherein the synthetic fibers comprise first fibers having a first average diameter of 2 μm or more, and second fibers having a second average diameter less than 1 μm, and wherein a first average length of the first fibers is greater than a second average length of the second fibers.

9. The fibrous media according to claim 1, wherein the synthetic fibers comprise undrawn fibers in an amount of 15 to 50% by weight based on a total weight of fibers.

10. The fibrous media according to claim 1, wherein the synthetic fibers comprise thermoplastic synthetic fibers having an average diameter from 0.1 µm to 15 µm, and an average length from 1 to 50 mm.

11. The fibrous media according to claim 1, wherein the synthetic fibers include up to 40% by weight based on a total weight of the synthetic fibers of a regenerated cellulosic material.

12. The fibrous media according to claim 1, wherein the synthetic fibers consist essentially of fibers of a synthetic material having a glass transition point or melting point greater than 130° C.

13. The fibrous media according to claim 1, wherein the fibrous web has an average thickness of 0.6 to 1.5 mm.

14. The fibrous media according to claim 1, wherein the fibrous web is corrugated, and wherein the fibrous web has a corrugation depth of about 0.1 to 0.5 mm.

15. The fibrous media according to claim 1, wherein the fibrous media further comprises a nanofiber coating, wherein the nanofiber coating includes electrospun nanofibers, and wherein the nanofiber coating has a thickness of 50 to 100 nm.

16. The fibrous media according to claim 1, wherein the fibrous web is wet-laid.

17. The fibrous media according to claim 1, wherein:
a basic weight of the fibrous web is between 50 and 400 grams per square meter;
an air permeability of the fibrous web for oil is between 2 and 600 cubic feet per minute per square foot; and
a hot burst strength of the fibrous web after 500 hours in hot oil is at least 20 psi.

18. The fibrous media according to claim 1, wherein:
the synthetic fibers comprise thermoplastic polymer fibers in an amount from between 60% to 88% by weight of the fibrous web; and
the fibrous web further comprises a coating made of the thermoset binder wherein the thermoset binder is composed of a phenolic resin, an acrylic resin, an epoxy resin, or a melamine formaldehyde, and wherein the amount of the thermoset binder is from 15% to 30 wt.-% by weight of the fibrous web.

19. The fibrous media according to claim 1, wherein said fibrous media exhibits at a caliper of 20 to 60 mils at least one of the following parameters:
a stiffness (SD), in machine direction, of 3,300 to 10,000 mg;
a filtering efficiency against 15 micron particles of 20 to 99%; and
a dirt holding capacity of 70 to 150 mg/in$^2$.

* * * * *